United States Patent [19]

Benthake

[11] 4,070,923
[45] Jan. 31, 1978

[54] MULTIPLE PINION CONCENTRIC DRIVE

[75] Inventor: Heinrich Benthake, Mulheim (Ruhr), Germany

[73] Assignee: WGW Westdeutsche Getriebe und Kupplungswerke GmbH, Bochum, Germany

[21] Appl. No.: 671,114

[22] Filed: Mar. 29, 1976

[30] Foreign Application Priority Data

Oct. 27, 1975 Germany .............................. 2547944

[51] Int. Cl.² ...................... F16H 37/06; F16H 57/10
[52] U.S. Cl. ................................... 74/665 P; 74/786; 74/411; 74/411.5
[58] Field of Search ...................... 74/410, 411, 665 P, 74/785, 786, 411.5

[56] References Cited

U.S. PATENT DOCUMENTS

| 1,458,131 | 6/1923 | Davis .......................... 74/410 |
| 1,551,844 | 9/1925 | Parsons et al. ................ 74/410 |
| 1,634,376 | 7/1927 | Miller ......................... 74/410 |
| 3,205,726 | 9/1965 | Stoeckicht .................. 74/411.5 |
| 3,397,589 | 8/1968 | Moore ....................... 74/410 X |
| 3,517,566 | 6/1970 | Cornford ................... 74/410 X |
| 3,807,250 | 4/1974 | Dietzel et al. .............. 74/410 |
| 3,995,841 | 12/1976 | Riegler et al. ............. 74/411.5 X |

FOREIGN PATENT DOCUMENTS

| 43,005 | 9/1930 | Denmark ...................... 74/786 |
| 1,365,123 | 5/1964 | France ....................... 74/665 P |

Primary Examiner—Samuel Scott
Assistant Examiner—Lance W. Chandler
Attorney, Agent, or Firm—Herbert L. Lerner

[57] ABSTRACT

Multiple pinion concentric drive with a gear of large diameter fixed on a driven shaft having disposed before each drive pinion and connected thereto a rotatable drive gearing unit which in turn is connected with a distributor gearing for driving the rotatable drive gearing unit, which latter has an outer concentric wheel pivoting on its bearing support and its reaction moment acting against an elastic member such as a hydraulic piston cylinder unit. The elastic support of the reaction moments of outer concentric wheels has among other advantages, the advantage that no reaction moments of different magnitude can occur and thus all transmitted power components in the individual power branches driving each drive pinion are of equal magnitude.

10 Claims, 6 Drawing Figures

MULTIPLE PINION CONCENTRIC DRIVE

This invention relates to a gear drive and more particularly to a new and improved multiple pinion concentric drive with a gear of larger diameter secured to a machine shaft or a driven shaft of a gear unit.

Spur gear drives and planetary gearing are known as basic drive elements for the drive of low speed machines with high drive power requirements, such as mills, mixing drums, converters and cinder conveyors, etc.

Conventional spur gear drives are very large and heavy or if more than two pinions are meshed with the large driven gear, they have very complicated load balancing or equalizing systems. For this application, where the large gear which is connected to the machine was driven by two pinions, some provision was made for power distribution or distribution of momentum. DAS No. 1,224,579 shows a multiple pinion drive for a large spur gear in which drive for the most equal distribution of turning moments or torque, the individual drive pinions are contained with an associated worm gear drive in its own bearing housing. Two of these bearing houses are arranged on both sides of the spur gear to be diagonally opposed. Each bearing housing is supported by the machine frame and opposing bearing housings are connected by guided control rods in such a manner that a jointed rectangle is formed which is supported at both ends by the guided control rods. Such a movably arranged coupling of the two drive pinions with each other requires of necessity that both bearing housings are supported by the spur gear. To effect this in the known multiple drive, the individual bearing housings exhibit on the side facing the gear rim, wear surfaces or rollers, which support the bearing housings on respective wear surfaces on the gear rim. This construction has shortcomings in the distribution of the turning moments among the pinions and results in a relatively high manufacturing and assembly effort.

DAS No. 2,104,705 discloses a multiple drive for a spur gear of larger diameter in which, for equalization of moments, the pinions are supported in a common carrier, which is independent from the spur gear movable to all sides, connected to the machine base, whereby the gear and the carrier are only connected through the drive pinions. By this arrangement, an improvement with respect to the moment distribution of the drive according to DAS No. 1,224,579 is achieved. However, in practice, it has been shown that this type of drive has a relatively high manufacturing cost.

Gear drives are known for transmission of high drive power with a transmission ratio of 1:60 which show a three step formation, whereby the power distribution is effected by double cogged drive pinions in such a manner that the pinions are disposed in an axially movable shaft. However, these gear drives permit only power distribution to two power branches so that these drives are relatively heavy and costly.

Conventional planetary gearing also work on the principle of power distribution. The construction of this type of planetary gear drives is relatively light. However, at high power applications with low number of revolutions, manufacturing costs are extremely high since the internally toothed central gear entails special manufacturing difficulties and also the other parts of the drive have to be manufactured with utmost precision.

An object of the present invention is to provide a concentric drive system for very high drive power output at low number of revolutions. Another object is to provide a drive system which is light and compactly constructed, and provides an exact equalization of the moments on the individual pinions. A further object is to provide a concentric drive system which can be manufactured at low cost.

In accordance with the present invention a concentric drive system for high power output at low number of revolutions is provided by a multiple pinion concentric drive with a gear of large diameter fixed on a driven shaft, said drive pinion of said gear of large diameter preceded by a rotatable gearing unit for driving said pinions, said rotatable gearing unit connected to and driven by a distributor gearing, said rotatable gearing unit having an outer concentric wheel rotatably mounted thereon and connected to an elastic member with its reaction moment acting against said elastic member.

In an embodiment of the invention, the multiple pinion concentric drive is connected by a planetary carrier to the drive pinions and has an inner center gear in connection with and driven by said distributor gearing, a planetary wheel carrier in connection with and driven by said inner center gear, said planetary wheel connected with said drive pinion to drive said pinion.

Before each drive pinion of the gear is disposed a rotatable drive gearing unit, which latter is in connection with the distributor gearing so that the outer concentric gear wheel of the rotatable gearing unit pivots on its bearing support 23 and its reaction moment is acting against an elastic member. A central driver system is created which consists of several driver elements, which by itself can be easily constructed and cheaply manufactured, so that the whole drive unit can be built cheaper and more easily. Thus, an increase in manufacturing cost which arises from increasing system size, is avoided. Furthermore, the arrangements according to the invention results in considerably greater reliability and less downtime of the whole central driver system, particularly when more than three pinions are disposed at the driven large gear. Thus, if perchance there are one or several defective pinions and/or rotatable drive boxes, the maximum moment to be transmitted can be taken up by the other non-defective elements. This is of special advantage with respect to maintenance and inspection of this heavy concentric machine drive, because in the case of damage, the defective member can be taken off and repaired without taking the concentric driver and the driven machine out of operation for a long time.

The elastic support of the reaction moments of the outer concentric wheel has the advantage that no reaction moments of different magnitude can occur, so that also all transmitted power components in the individual power branches are of equal magnitude.

Particularly advantageous is the use of the concentric driver according to the invention, for driving fragmentation mills because it is easily possible to couple the distributor drive with the rotatable gearing unit by means of elongated toothed couplings, whereby space can be kept open between the upper power branches and between the distributor drive and the driven large gear, which space is large enough to accommodate a centralized discharge output of the mill.

The rotatable gearing unit may be connected through the planetary gear carrier with the drive pinion and through the inner center gear wheel to the distributor driver. In this manner the rotatable gearing unit can be easily connected to the pinions of the large drive wheel and with the distributor drive. Preferably, the rotatable gearing unit is coupled with the drive pinions by a detachable flange, so that quick assembly and disassembly is made possible.

In one embodiment the outer concentric gear wheel is supported by a hydraulic piston cylinder device. This represents a particular simple and reliable elastic support. Other elastic supports suitable for the purpose such as springs may be employed.

In a preferred embodiment of the invention, provisions are made to connect the hydraulic piston cylinder units with each other. Thereby the hydraulic cylinders which are under equal pressure through a common hydraulic oil pressure system, generate equal reaction mements at the respective planetary stages and all power branches transmit equal turning moments. It is advantageous to dispose a device for damping of load peaks in the hydraulic system, preferably a gas pressure damper. Thereby, a damping of impulse moments and a more uniform power transmission is achieved. The suitable damping of load peaks permits lighter construction with higher operating safety and reduces the manufacturing cost of the driven system.

In a further embodiment of the invention, a control unit, preferably a valve, is provided with the outer concentric gear wheel of the rotatable gearing unit, and connected for position regulation of the hydraulic piston cylinder unit. In this way, it is possible to compensate immediately for leakage losses at the hydraulic cylinders and to regulate the pressure of the hydraulic pistons. At a deviation of a predetermined zero position, hydraulic liquid is fed into the connecting line until the piston and thereby the concentric wheel of the rotatable gearing unit are again in their normal predetermined position. The other outer concentric wheels also follow this adjustment motion because they are mechanically connected through the gears of the rotatable gearing unit and through the drive pinion which mesh with the large gear. Preferably, the control unit is connected with the pressure side of a hydraulic pump so that the pressure regulation of the hydraulic cylinders can take place immediately in the case of leakage losses.

Other features which are considered as characteristic for the invention are set forth in the appended claims.

Although the invention is illustrated and described herein as embodied in multiple pinion concentric drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of special embodiments when read in connection with the accompanying drawings, in which:

FIG. 1 shows the concentric driver system in section;

FIG. 2 a partial section of the concentric driver according to FIG. 1 with the flange connection between the rotatable gearing unit and the drive pinions in enlarged scale;

Figure 1:
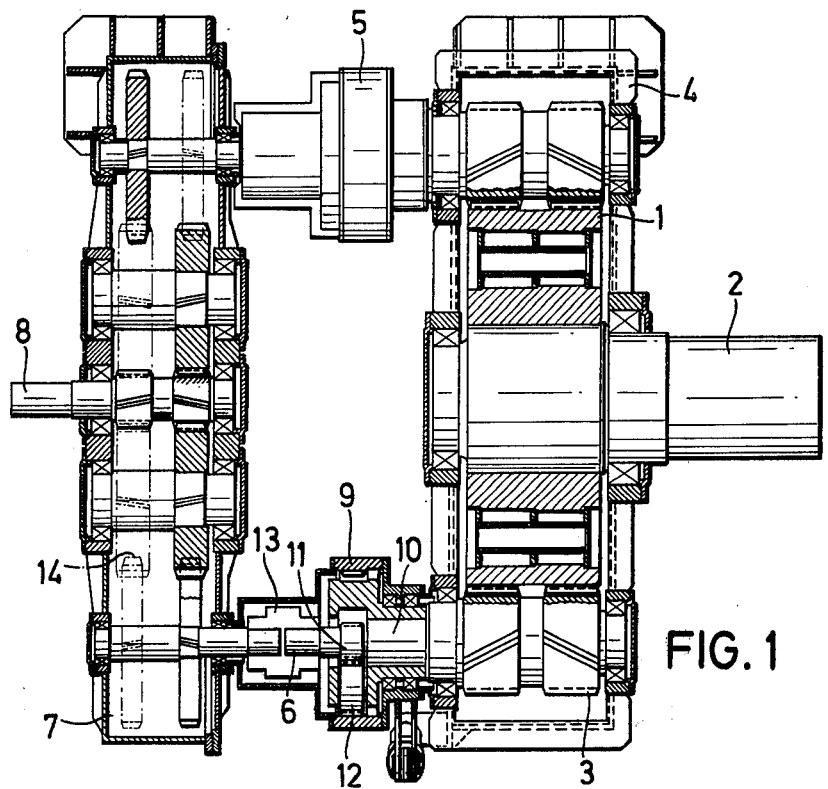
Figure 2:
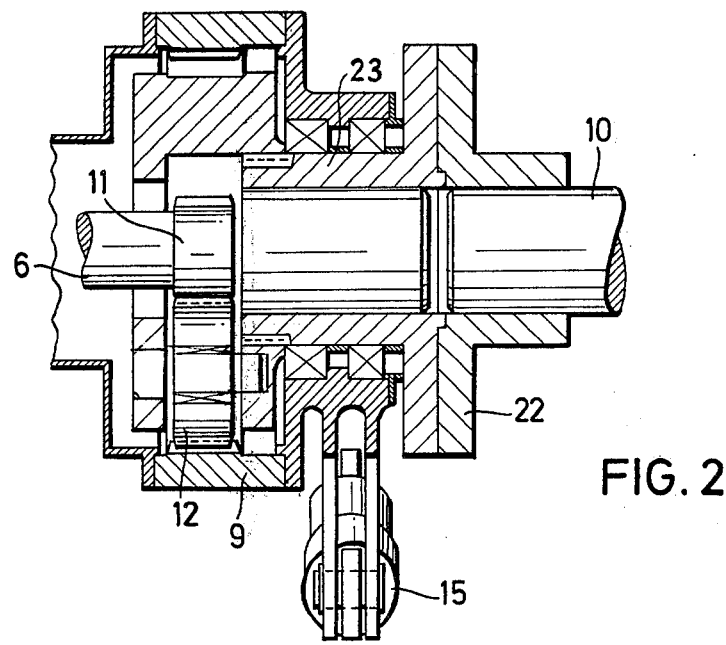
Figure 3:
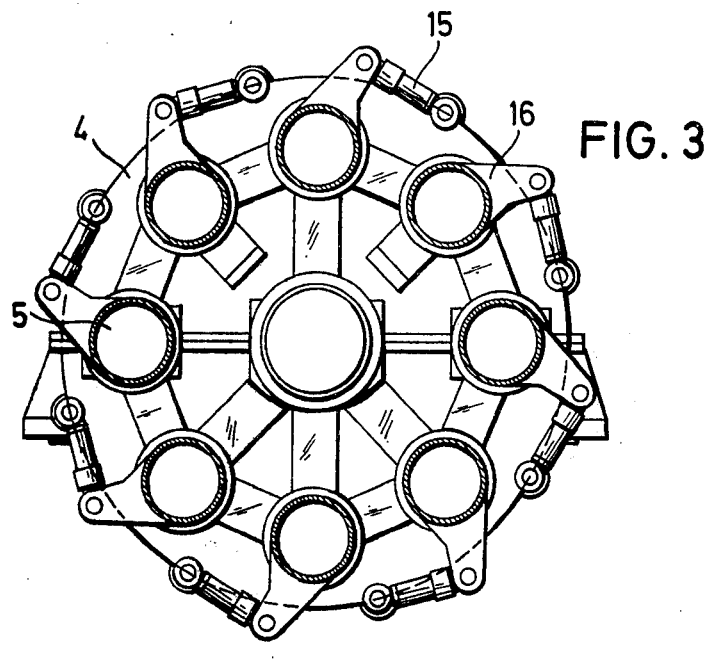
FIG. 3 shows a view of the hydraulic support of the rotatable gearing unit in reduced scale.
Figure 4:
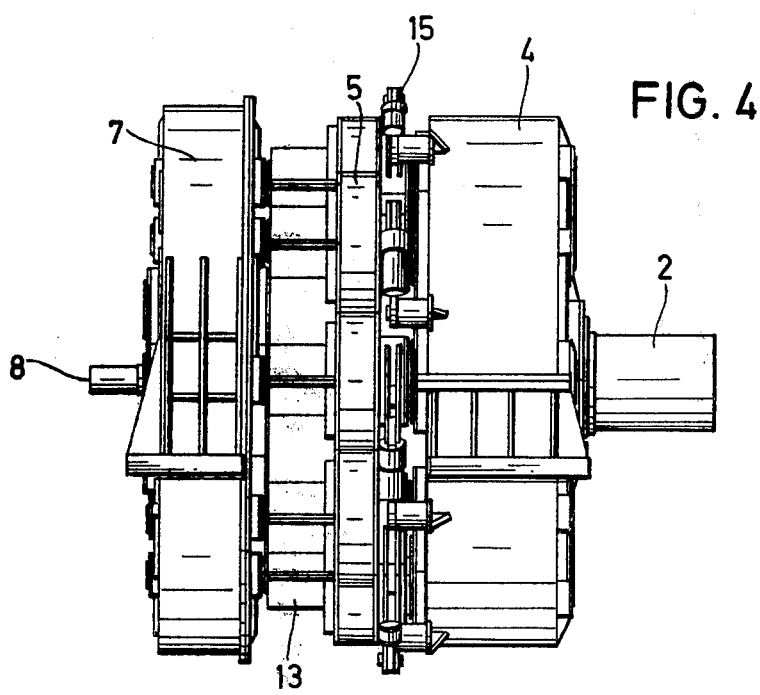
FIG. 4 shows a plan view of the concentric driver in reduced scale.

FIGS. 1 to 4 illustrate the drive principles of the concentric driving system. The driven large gear 1, secured on the machine shaft, respectively the drive shaft 2, is driven by at least two, but preferably eight pinions 3 as shown in FIG. 3. The drive pinions 3 are disposed in a common housing 4 which oil-tightly encloses gear 1 and drive pinions 3. The drive pinions 3 are each coupled with a planetary wheel carrier 12 of a rotatable gearing unit 5. Rotatable gearing unit 5 is mounted on drive pin 10 of pinion 3 which meshes with gear 1. As shown in FIG. 2, the rotatable gearing unit is preferably coupled to drive pinion 3 by a detachable flange 22, so that it can be assembled and disassembled without disturbing distributor drive 7 or the driven main drive with the gear 1 and drive pinions 3. The inner center wheel or gear 11 of the rotatable gearing unit 5 is driven by a distributor drive gearing 7. The drive shaft 6 of the inner center gear 11 of the rotatable gearing unit 5 is coupled by a conventional coupling 13 with distributor gear unit 7. The drive motor for the concentric driver system is connected to drive shaft 8 of the distributor gearing unit. The drive motor can be of any suitable construction, and is not described in detail.

Distributor gearing unit 7 has intermediate gears 14 for bridging the axis-distance between drive shaft 8 and shaft 6 of the inner center gear 11 of rotatable gearing unit 5. The outer concentric gears or ring gears 9 of rotatable gearing unit 5 which are disposed between driven large gear 1 and distributor gearing 7, are rotatably mounted whereby the reaction moments act on hydraulic piston cylinder units 15 which in turn, as shown in FIG. 3, acts against drive housing 4 through lever arm 16 which latter is secured to outer concentric wheel 9. It is also within the scope of the invention to exchange, for outer support, the outer concentric wheel with the carrier of the planetary gears.

Figure 5:
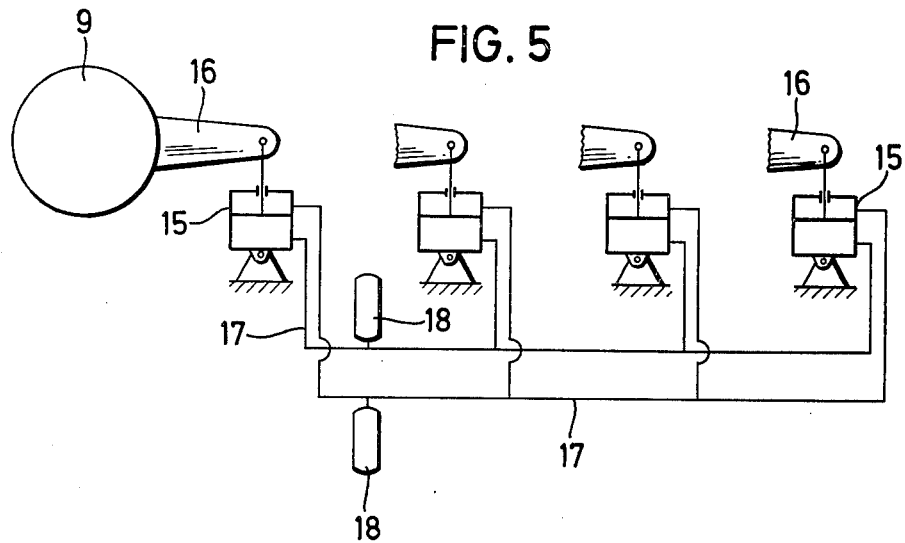
FIG. 5 shows a schematic view of the pressure equalizing system for support of the rotatable gearing.
Figure 6:
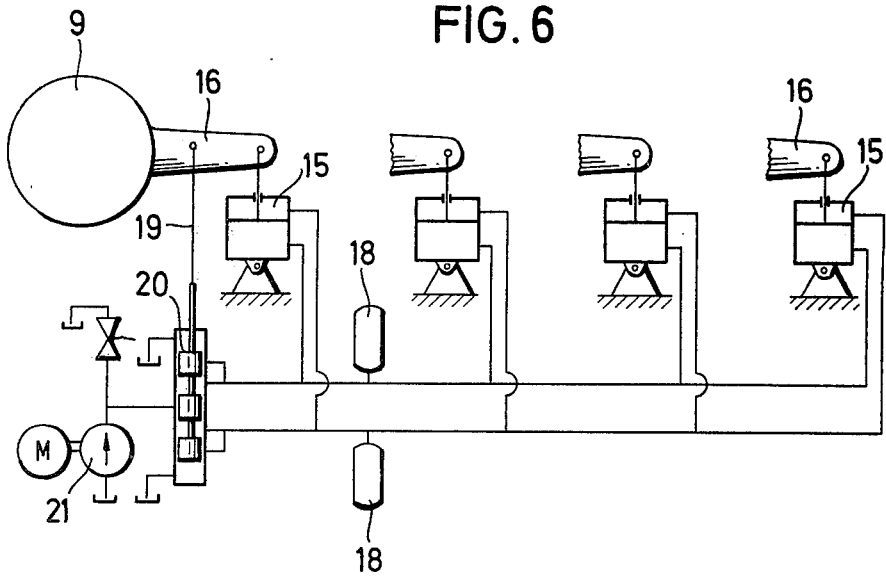
FIG. 6 shows a schematic view of the position regulating system.

Hydraulic cylinders 15 are connected to each other by pressure lines 17, as shown in FIGS. 5 and 6. In this manner, it is made certain that all power branches of the concentric drive transmit equal turning moments. Preferably, several pressure dampers 18 are disposed in pressure lines 17 which dampers effect damping of the impulse moments and peak loads so that the concentric drive can be made in smaller dimensions throughout.

To compensate for leakage losses at the hydraulic cylinders 15, a valve unit 20 is connected to connecting lines 17 for regulation of the position of the hydraulic pistons. The valve unit 20 is connected to the lever arm of the outer concentric wheel 9 of at least one rotatable gearing unit by pushrod 19. If a deviation from the predetermined zero position occurs, a hydraulic pump 21 feeds hydraulic liquid into connection lines 17 which has been opened by the piston of valve unit 20 until the position regulation concentric wheel is again in the normal position. The other concentric wheels 9 follow this adjustment also, because they are mechanically connected through the gears to the outer concentric wheel of the position regulating rotatable gearing unit.

The flexibility of the invention and its adaptability to different applications is illustrated as follows: By using the concentric gear drive in accordance with the invention, it is a simple matter to mesh driven large gear 1 only with seven pinions, instead of with eight pinions as shown in the figures, whereby, for example, for the drive of a fragmentation mill, the uppermost pinion and the upper rotatable gearing unit are removed and a space is formed between drive housing 4 of gear 1 and distributor gearing 7 which space is large enough to permit a centrally located output of the mill. In this manner, it is possible without great effort, to adapt the concentric drive of the present invention, to various drive requirements.

There is claimed:

1. Multiple pinion concentric drive having a plurality of pinions meshing with a main gear fixed on a driven shaft, the main gear having a diameter larger than that of the pinions, comprising a respective rotatable gearing unit preceding and connected to the pinions for driving said pinions, the rotatable gearing units being connected to and driven by a distributor gearing, said rotatable gearing units having a respective outer concentric gear rotatably mounted thereon, and an elastic member for each of said rotatable gearing units respectively connected to said outer concentric gear so that the reaction moment of said outer concentric gear acts against said elastic member, and is damped by said elastic member whereby a uniform turning moment distribution is effected.

2. Multiple pinion concentric drive according to claim 1 wherein said rotatable gearing unit has an inner center gear in connection with and driven by said distributor gearing, a planetary wheel carrier in connection with and driven by said inner center gear, said planetary wheel connected with said pinion to drive said pinion.

3. Multiple pinion-concentric drive according to claim 1, including a drive shaft and wherein said distributor gearing has additional intermediate wheels for bridging the axis distance between said drive shaft and the shaft of said inner center gear of said rotatable gearing unit.

4. Multipe pinion concentric drive according to claim 1, wherein said rotatable gearing unit is coupled to said drive pinions 3 by a detachable flange connection.

5. Multiple pinion concentric drive having a plurality of pinions meshing with a main gear fixed on a driven shaft, the main gear having a diameter larger than that of the pinions, comprising a respective rotatable gearing unit preceding and connected to the pinions for driving said pinions, the rotatable gearing units being connected to and driven by a distributor gearing, said rotatable gearing units having a respective outer concentric gear rotatably mounted thereon, and an elastic member for each of said rotatable gearing units respectively connected to said outer concentric gear so that the reaction moment of said outer concentric gear acts against said elastic member, said elastic member being an hydraulic piston cylinder unit supporting said outer concentric wheel.

6. Multiple pinion concentric drive according to claim 5, wherein said drive pinions and said gear of large diameter are disposed in a common housing and said piston cylinder unit is secured on said common housing.

7. Multiple pinion concentric drive according to claim 6 wherein said hydraulic piston cylinder units are connected to each other.

8. Multiple pinion concentric drive according to claim 7 wherein at least one device for damping of load peaks is disposed within the hydraulic connection.

9. Multiple pinion concentric drive according to claim 5 wherein a control unit is connected to said outer concentric wheel of at least one said rotatable gearing unit for regulation of the position of said piston cylinder units.

10. Multiple pinion concentric drive according to claim 9 wherein said control unit is connected to the pressure side of a hydraulic pump.

* * * * *